United States Patent [19]

Dershem et al.

[11] Patent Number: 5,717,034
[45] Date of Patent: Feb. 10, 1998

[54] PERFLUORINATED HYDROCARBON POLYMER-FILLED ADHESIVE FORMULATIONS AND USES THEREFOR

[75] Inventors: Stephen M. Dershem; Deborah D. Forray, both of San Diego, Calif.

[73] Assignee: Quantum Materials, Inc., San Diego, Calif.

[21] Appl. No.: 688,206

[22] Filed: Jul. 29, 1996

[51] Int. Cl.$^6$ ................................................. C08F 259/00
[52] U.S. Cl. ..................... 525/276; 525/275; 525/282; 525/302; 525/308; 525/312
[58] Field of Search .................... 525/276, 282, 525/302, 275, 308, 312, 104

[56] References Cited

U.S. PATENT DOCUMENTS

| | | | |
|---|---|---|---|
| 5,428,097 | 6/1995 | Kobayashi | 524/493 |
| 5,446,118 | 8/1995 | Shen et al. | 526/245 |

FOREIGN PATENT DOCUMENTS

WO 96/07691  3/1996  WIPO ................ C08G 73/10

OTHER PUBLICATIONS

Product literature from manufacturer, "Teflon MP 1600N, fluoroadditive", *DuPont Fluoroproducts* (two pages).

*Primary Examiner*—Edward J. Cain
*Attorney, Agent, or Firm*—Stephen E. Reiter; Gray Cary Ware & Freidenrich

[57] ABSTRACT

In accordance with the present invention, it has been discovered that perfluorinated hydrocarbon polymers can be used as fillers for the preparation of adhesive formulations having excellent dielectric properties, i.e., very low conductivities. Invention compositions display excellent rheological properties, in addition to low dielectric constants. Invention formulations can be used for a variety of purposes, such as, for example, for the preparation of filled adhesive formulations with a reduced propensity to settle out, excellent dispensing characteristics due to the thixotropic nature thereof, and the like.

18 Claims, No Drawings

PERFLUORINATED HYDROCARBON POLYMER-FILLED ADHESIVE FORMULATIONS AND USES THEREFOR

FIELD OF THE INVENTION

The present invention relates to adhesive formulations and uses therefor. In a particular aspect, the present invention relates to filled adhesive formulations having excellent dielectric properties, i.e., very low conductivities. In another aspect, the present invention relates to perfluorinated hydrocarbon polymer-filled adhesive formulations.

BACKGROUND OF THE INVENTION

There are many potential applications for adhesives having electrically insulating properties. Such materials must, however, satisfy a combination of criteria, i.e., in addition to exhibiting a low dielectric constant, such materials must also have good dispensability and good adhesion properties. Non-conductive fillers traditionally employed for the preparation of adhesives having electrically insulating properties include aluminum nitride, boron nitride, alumina, silicon dioxide, and the like. Unfortunately, these materials do not impart good rheological properties to the adhesive pastes prepared therefrom.

The rheology of an adhesive paste is a very important consideration for manufacturing purposes. For example, separation of the filler from the resin in the syringe, a clean break of adhesive between each dispense thereof, and the presence of drip-free syringes in the dispense operation are all important attributes for consistent dispensing properties.

BRIEF DESCRIPTION OF THE INVENTION

In accordance with the present invention, we have discovered that perfluorinated hydrocarbon polymers can be used as fillers for the preparation of adhesive formulations having excellent dielectric properties, i.e., very low conductivities. Invention compositions display excellent rheological properties, in addition to low dielectric constants.

Invention formulations possess a low dielectric constant ($D_K$). The dielectric constant is a dimensionless ratio which provides a measure of the degree to which a material can resist the flow of electric charge independent of the field strength. Furthermore, the perfluorinated hydrocarbon polymer fillers employed for the preparation of invention formulations impart a low dissipation factor ($D_f$) to the resulting formulations. Low $D_f$ materials are noted for their resistance to leakage of electrical current under an applied charge.

Invention formulations can be used for a variety of purposes, such as, for example, for the preparation of filled adhesive formulations with a reduced propensity to settle out, excellent dispensing characteristics due to the thixotropic nature thereof, and the like.

DETAILED DESCRIPTION OF THE INVENTION

In accordance with the present invention, there are provided adhesive compositions having excellent dielectric properties, said compositions comprising:

a polymerizable monomer vehicle which, upon crosslinking, possesses good adhesion properties, a perfluorinated hydrocarbon polymer, and a curing catalyst.

As readily recognized by those of skill in the art, a wide variety of additional components can optionally be incorporated into the above-described formulation, such as, for example, coupling agents, anti-oxidants, stabilizers, bleed control agents, additional fillers (other than the required perfluorinated hydrocarbon polymer), inert diluents, reactive diluents, adhesion promoters, flexibilizers, dyes, pigments, and the like.

While the use of inert diluents is not excluded from the practice of the present invention, it is generally preferred that compositions according to the invention remain substantially free of solvent, so as to avoid the potentially detrimental effects thereof, e.g., creation of voids caused by solvent escape, the environmental impact of vaporized solvent, the redeposition of outgassed molecules in the surface of the article, and the like.

Monomer vehicles contemplated for use in accordance with the present invention include maleimides, (meth) acrylates, propargyl ether materials, isomerized propargyl ether materials, silicone-based adhesive formulations, and the like, as well as mixtures of any two or more thereof.

Exemplary maleimides contemplated for use in the practice of the present invention include compounds having the structure I as follows:

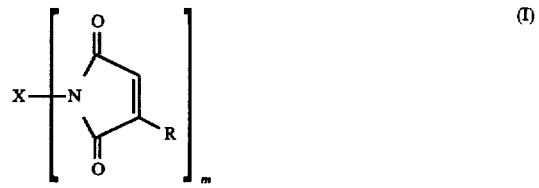

wherein:

m=1, 2 or 3, each R is independently selected from hydrogen or lower alkyl, and

X is a monovalent or polyvalent radical selected from:

branched chain alkyl, alkylene or alkylene oxide species having from about 12 to about 500 carbon atoms, aromatic groups having the structure:

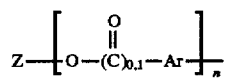

wherein:

n=1, 2 or 3, each Ar is a monosubstituted, disubstituted or trisubstituted aromatic or heteroaromatic ring having in the range of 3 up to 10 carbon atoms, and Z is a branched chain alkyl, alkylene or alkylene oxide species having from about 12 to about 500 atoms in the backbone thereof, or mixtures thereof.

As employed herein, the term "alkyl" refers to straight or branched chain alkyl radicals having in the range of about 1 up to 8 carbon atoms, and "lower alkyl" refers to straight or branched chain alkyl radicals having in the range of about 1 up to 4 carbon atoms.

As employed herein, the term "alkenyl" refers to straight or branched chain hydrocarbyl radicals having at least one carbon-carbon double bond, and having in the range of about 2 up to 8 carbon atoms.

As employed herein, the term "alkynyl" refers to straight or branched chain hydrocarbyl radicals having at least one carbon-carbon triple bond, and having in the range of about 2 up to 8 carbon atoms.

As employed herein, the term "alkoxy" refers to an oxygen-bearing alkyl moiety having the structure —OR, wherein R is an alkyl group as defined above.

As employed herein, the term "halogen" refers to fluoride, chloride, bromide or iodide radicals.

Presently preferred maleimides employed in the practice of the present invention include compounds having structure I, wherein X is an alkylene or alkylene oxide species having from about 20 to about 100 carbon atoms. An especially preferred maleimide for use herein is a compound having structure I, wherein X is a 10,11-dioctyl-1,20-eicosyl radical.

Exemplary (meth)acrylates contemplated for use in the practice of the present invention include compounds having structure II as follows:

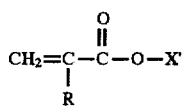

(II)

wherein R is H or methyl, and X' is selected from:

(a) an alkyl group having in the range of about 8 up to 24 carbon atoms, or

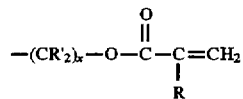

(b)

wherein each R' is independently selected from H or methyl, R is as defined above, selected independently of R of the core structure, and x is an integer falling in the range of about 2 up to 6.

Presently preferred (meth)acrylates contemplated for use in the practice of the present invention include tridecyl methacrylate, 1,6-hexanediol dimethacrylate, 1,10-decanediol diacrylate, 1,10-decanediol dimethacrylate, 1,12-dodecanediol diacrylate, 1,12-dodecanediol dimethacrylate, and the like.

Exemplary propargyl ether materials contemplated for use in the practice of the present invention include compounds having structure III as follows:

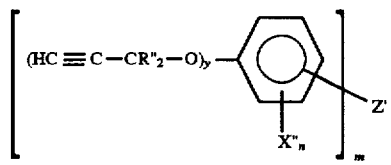

(III)

wherein:

X" is selected from alkyl, cycloalkyl, alkenyl, alkynyl, aryl, alkoxy, halogen, cyano, or the like;

Z', when present, is a di- or trivalent radical capable of linking two or three of the benzopyrene moieties;

each R" is independently selected from hydrogen or alkyl having up to 40 carbon atoms;

m is 1, 2 or 3; and n is an integer from 0 up to 3; and y is an integer from 1 up to 3.

Presently preferred propargyl ether compounds employed in the practice of the present invention are those wherein:

X" (when present) is allyl;

Z' is selected from:

—O—,

—C(O)—

—C(O)—O—,

—O—C(O)—O—,

—S—,

—S(O)$_2$—,

—[CR'$_2$]$_x$—, wherein each R' is independently selected from hydrogen, alkyl, fluoroalkyl, cycloalkyl or fluorocycloalkyl, and x is an integer falling in the range of 1 up to 20, —[O—(CR'$_2$)$_x$]$_y$—O—, wherein each R' is independently as defined above, x' is an integer falling in the range of 1 up to 6, and y is an integer falling in the range of 1 up to 20,

—SIR'$_2$—,

—SiR'$_2$—[—O—SiR'$_2$—]$_{y'}$—, wherein y' is an integer falling in the range of 1 up to 20,

—N—,

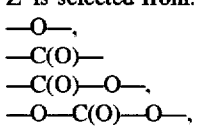

arylene, or cycloalkylene;

R" is selected from hydrogen or methyl;

m is 2; and n is an integer from 0 up to 2.

Especially preferred propargyl ether compounds contemplated for use in the practice of the present invention are those wherein Z' is —CHR$^a$—, R$^a$ is lower alkyl, m is 2 and n is 0.

Exemplary isomerized propargyl ether materials contemplated for use in the practice of the present invention include compounds having structure IV as follows:

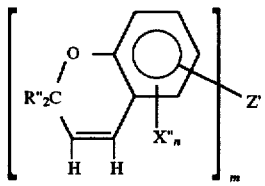

(IV)

wherein:

X" is selected from alkyl, cycloalkyl, alkenyl, alkynyl, aryl, alkoxy, propargyloxy (which can undergo further cyclization to produce additional benzopyran rings), halogen or cyano;

Z', when present, is a di- or trivalent radical capable of linking two or three of the benzopyran moieties;

each R" is independently selected from hydrogen or alkyl having up to 40 carbon atoms;

m is 1, 2 or 3; and n is an integer from 0 up to 3.

Presently preferred isomerized propargyl ether compounds employed in the practice of the present invention are those wherein:

X" (when present) is allyl;

Z' is selected from:

—O—,

—C(O)—,

—C(O)—O—,

—O—C(O)—O—,

—S—,

—S(O)$_2$—,

—[CR'$_2$]$_x$—, wherein each R' is independently selected from hydrogen, alkyl, fluoroalkyl, cycloalkyl or fluorocycloalkyl, and x is an integer falling in the range of 1 up to 20, —[O—(CR'$_2$)$_x$]$_y$—O—, wherein each R' is independently as defined above, x' is an integer falling in the range of 1 up to 6, and y is an integer falling in the range of 1 up to 20, —SiR'$_2$—, —SiR'$_2$—[—O—SiR'$_2$—]$_{y'}$—, wherein y' is an integer falling in the range of 1 up to 20,

—N—, $$-\underset{|}{\text{NR}'}-,$$

arylene, or cycloalkylene;

R" is selected from hydrogen or methyl;

m is 2; and n is an integer from 0 up to 2.

Especially preferred isomerized propargyl ether compounds contemplated for use in the practice of the present invention are those wherein Z' is —CHR$^x$—, R$^x$ is lower alkyl, m is 2 and n is 0.

Silicone-based adhesive formulations contemplated for use in the practice of the present invention comprise a substantially stoichiometric mixture of hydride-terminated polysiloxane(s) and vinyl-terminated polysiloxane(s). An exemplary hydride-terminated polysiloxane contemplated for use herein is a hydride terminated polydimethylsiloxane. An exemplary vinyl-terminated polysiloxane contemplated for use herein is a divinyl terminated polydimethylsiloxane.

A wide variety of perfluorinated hydrocarbon polymers can be employed for the preparation of invention compositions. Many such materials are available commercially, for example, from DuPont under the tradename "Teflon" or from Hoechst-Celanese under the tradename "Hostafalon". Exemplary perfluorinated hydrocarbon polymers contemplated for use in accordance with the present invention are typically characterized as having a particle size in the range of about 0.1 up to about 100 μm, a surface area in the range of about 0.2 up to about 20 g/m$^2$, and a bulk density of at least 100 g/L.

Presently preferred perfluorinated hydrocarbon polymers employed in the practice of the present invention are characterized as having an average bulk density in the range of about 250–500 g/L, a melting peak temperature (as determined by ASTM D1457) of 325±5° C., an average particle size distribution in the range of about 8–15 μm, a specific surface area in the range of about 8–12 m$^2$/g, and a relatively narrow molecular weight distribution.

As readily recognized by those of skill in the art, a wide variety of curing catalysts can be employed in the preparation of invention compositions. The preferred catalyst to be used will, of course, depend on the monomer vehicle employed. For example, for those monomer vehicles which cure by a free radical mechanism, free radical initiators such as peroxy esters, peroxy carbonates, hydroperoxides, alkylperoxides, arylperoxides, and the like can be employed.

For those monomer vehicles which cure by cationic and/or anionic polymerization, cationic catalysts, transition metal catalysts, and the like can be employed. Exemplary cationic catalysts contemplated for use herein include onium salts, iodonium salts, sulfonium salts, and the like.

Exemplary transition metal catalysts contemplated for use herein include nickel, copper, cobalt and the like, in the form of a chelate, a soap, or the like.

The ratio of the various components of invention compositions can vary within wide ranges. For example, the quantity of monomer vehicle can vary anywhere within the range of about 25 to about 90 wt. percent of invention composition, with quantities in the range of about 40 up to about 80 wt. percent (based on the total weight of the final composition) being presently preferred.

Similarly, the quantity of perfluorinated hydrocarbon polymer employed in the practice of the present invention can vary within wide ranges, typically falling in the range of about 10 up to about 75 wt. percent of invention composition, with quantities in the range of about 20 up to about 60 wt. percent (based on the total weight of the final composition) being presently preferred.

The quantity of curing catalyst employed in the practice of the present invention can also vary widely, typically falling in the range of about 0.01 up to about 10 wt. percent of said composition (based on the total weight of the finished composition). As readily recognized by those of skill in the art, quantities at the lower end of this range are generally suitable when using transition metal catalysts, while quantities falling in the middle to the upper end of the range are generally suitable when free radical initiators are employed.

Invention compositions have excellent handling properties, typically existing as a thixotropic paste, which can readily be dispensed using standard equipment.

In accordance with another embodiment of the present invention, there are provided methods for adhesively attaching a first article to a second article, said method comprising:

(a) applying the above-described composition to said first article, (b) bringing said first and second article into intimate contact to form an assembly wherein said first article and said second article are separated only by the adhesive composition applied in step (a), and thereafter, (c) subjecting said assembly to conditions suitable to cure said adhesive composition.

Curing conditions contemplated for carrying out the above-described method typically comprise a temperature in the range of about 100° up to 250° C., for in the range of about 0.001 up to about 6 hours, with in the range of about 0.01 up to about 0.5 hours curing time being presently preferred.

In accordance with still another embodiment of the present invention, there are provided methods for adhesively attaching a microelectronic device to a substrate, said method comprising:

(a) applying the above-described composition to said substrate and/or said microelectronic device, (b) bringing said substrate and said device into intimate contact to form an assembly wherein said substrate and said device are separated only by the die attach composition applied in step (a), and thereafter, (c) subjecting said assembly to conditions suitable to cure said die attach composition.

Curing conditions contemplated for carrying out the above-described method typically comprise a temperature in the range of about 100° up to 250° C., for in the range of about 0.001 up to about 6 hours, with in the range of about 0.01 up to about 0.5 hours curing time being presently preferred.

In accordance with yet another embodiment of the present invention, there are provided assemblies comprising a first article permanently adhered to a second article by a cured aliquot of the above-described composition. Such assemblies can be prepared from a variety of structures, e.g., wherein the first article is selected from a silicon-based microelectronic device, a gallium arsenide-based microelectronic device, a quartz-based microelectronic device, a sapphire-based microelectronic device, an indium phosphide-based microelectronic device, a cadmium sulfide-based microelectronic device, lithium niobate-based microelectronic device, and the like, and the second article is selected from lead frames, pin grid arrays, ceramics, and the like.

In accordance with a further embodiment of the present invention, there are provided assemblies comprising a microelectronic device permanently adhered to a substrate by a cured aliquot of the above-described composition.

Microelectronic devices contemplated for use in the practice of the present invention include lead frames, pin grid arrays, laminate materials, and the like.

As readily recognized by those of skill in the art, compositions according to the present invention can also be employed for the preparation of a variety of structures, e.g., advanced composites, molding resins, glob-top structures, underfill materials, and the like, employing techniques which are readily available in the art.

The invention will now be described in greater detail by reference to the following non-limiting examples.

EXAMPLE 1

A paste composition was prepared by thoroughly mixing a Teflon powder and a thermoset resin vehicle in a bowl. The resin vehicle employed was composed of:

60 wt % 1,20-bismaleimido-10,11-dioctyl-eicosane (BMI; see for example, U.S. Ser. Nos. 08/300,721 and 08/460,495, both of which are incorporated by reference herein), 13.0 wt % Ricon 130MA-20 (available from Ricon Resins, Inc., Grand Junction, Colo.), 22.0 wt % 1-vinyloxy-2-decyl tetradecane, (see for example, U.S. Ser. Nos. 08/300,721 and 08/460,495, both of which are incorporated by reference herein), 1.0 wt % USP90MD (a peroxide catalyst available from Witco Corporation, Argus Division, Marshall, Tex.), and 3 wt % Silquest A-186 plus 1 wt % Silquest A-174 (both of which are coupling agents available from OSI Specialities, Inc., South Charleston, W. Va.).

The Teflon powder used was Du Pont's product N (available from Du Pont Fluoroproducts, Wilmington, Del.). Forty percent by weight of this filler was mixed into the resin base until a white homogeneous paste was obtained. This paste was found to have a Brookfield 25° C. viscosity of 11,670 centipoise (cps) at 10 rpm and a thixotropic index (defined as the 1/20 rpm viscosity value) of 10.13.

The paste was dispensed onto two 8.3 mil thick silver plated lead frames. Twelve silicon dice (150×150×22 mil) were attached and set to a one mil bondline. All of the parts were subjected to a one minute cure at 200° C. The cured samples were then subjected to die shear on an Anza Tech., Inc. die shear tester. The average room temperature die shear value was 15.4 kilograms. The shear test was repeated on a heated stage set to 245° C. The average hot die shear value was 4.25 kilograms.

The paste was subjected to thermal analysis. Dynamic (10° C./minute) thermogravimetric analysis (using a Du Pont 9900 system) on a sample of the uncured paste revealed the composition to have only a 1.84% weight loss by the time the sample had reached 250° C. Differential scanning calorimetry (also at 10° C./min. on a Du Pont 9900) of the same paste revealed a cure exotherm maxima at 126.9° C.

EXAMPLE 2

A second paste composition was prepared according to the method outlined in Example 1. The same resin vehicle and Teflon filler was used. The composition this time, however, was formulated to contain 45 percent by weight of the filler. The resulting paste was found to have a Brookfield 10 rpm viscosity of 24,490 cps and a 1/20 thixotropic index of 13.53.

The paste prepared as described in the preceding paragraph was then used to attach silicon dice to silver plated copper lead frames as described in Example 1. The cured parts were found to have an average room temperature die shear adhesion of 15.47 and a hot (i.e., 245° C.) die shear of 4.08 kilograms.

Thermal analysis was also performed on this paste. The 250° C. weight loss by TGA was found to be 2.69%. The exotherm maxima according to DSC was 128.0° C.

EXAMPLE 3

A third paste composition was formulated according to the procedure described in Example 1. The same resin vehicle and Teflon filler were used. The percent filler, however, was reduced to 35% by weight of the composition. The resulting paste was found to have a Brookfield 10 rpm viscosity of 7,332 cps and a 1/20 thixotropic index of 6.96.

The paste prepared as described in the preceding paragraph was then used to attach silicon dice to silver plated copper lead frames as described in Example 1. The cured parts were found to have an average room temperature die shear value of 14.30 and a hot (i.e., 245° C.) die shear of 4.01 kilograms.

Thermal analysis was performed on this paste according to the method outlined in Example 1. The 250° C. weight loss by TGA was found to be 2.77%. The exotherm maxima according to DSC was 128.17° C.

EXAMPLE 4

The paste described in Example 1 was used to attach additional 150×150 mil silicon die to silver plated copper lead frames. These parts were cured at 200° C. for one minute. The assembled parts were placed in a pressure cooker and subjected to steam at a pressure of 15 psig and a temperature of 121° C. Parts were removed at 72 and 168 hours for room temperature die shear testing. The average die shear for the parts following 72 and 168 hours pressure cooker exposure was 9.40 and 9.49 kilograms, respectively. Thus, this accelerated moisture test revealed an approximate 40 % loss in adhesion, compared to initial die shear values, but the adhesion does not appear to degrade further upon continued exposure.

EXAMPLE 5

The paste described in Example 1 was used to attach 300×300×22 mil silicon die to 8.3 mil thick silver plated copper lead frames. The bondline was set to approximately 1.0 mil. These parts were then cured at 200° C. for one minute. The radius of curvature (ROC) for the cured assembly was measured using a Dektak IIA stylus profilometer and was found to be 2.77 meters. An ROC of greater than one meter is generally recognized by those of skill in the art to represent a bond having "low stress"

While the invention has been described in detail with reference to certain preferred embodiments thereof, it will be understood that modifications and variations are within the spirit and scope of that which is described and claimed.

That which is claimed is:

1. An adhesive composition having excellent dielectric properties, said composition comprising:
   a polymerizable monomer vehicle which, upon crosslinking, possesses good adhesion properties, wherein said monomer vehicle is a maleimide, a (meth)acrylate, a propargyl ether material, an isomerized propargyl ether material, or a mixture of any two or more thereof,
   a perfluorinated hydrocarbon polymer, and
   a curing catalyst.

2. A composition according to claim 1 wherein said perfluorinated hydrocarbon polymer is further characterized as having a particle size in the range of about 0.1 up to about 100 µm, a surface area in the range of about 0.2 up to about 20 g/m$^2$, and a bulk density of at least 100 g/L.

3. A composition according to claim 1 further comprising a coupling agent, an anti-oxidant, a stabilizer, a bleed control agent, additional fillers other than the required perfluorinated hydrocarbon polymer, an inert diluent, a reactive diluent, an adhesion promoter, a flexibilizer, a dye, a pigment, or a mixture of any two or more thereof.

4. A composition according to claim 1 wherein said maleimide has the structure:

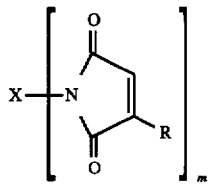

(I)

wherein:
m=1, 2 or 3,
each R is independently selected from hydrogen or lower alkyl, and
X is a monovalent or polyvalent radical selected from:
   branched chain alkyl, alkylene or alkylene oxide species having from about 12 to about 500 carbon atoms,
   aromatic groups having the structure:

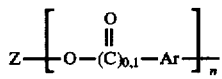

wherein:
n=1, 2 or 3,
each Ar is a monosubstituted, disubstituted or trisubstituted aromatic or heteroaromatic ring having in the range of 3 up to 10 carbon atoms, and
Z is a branched chain alkyl, alkylene or alkylene oxide species having from about 12 to about 500 atoms in the backbone thereof,
or mixtures thereof.

5. A composition according to claim 4 wherein X is an alkylene or alkylene oxide species having from about to about 100 carbon atoms.

6. A composition according to claim 5 wherein X is a 10,11-dioctyl-1,20-eicosyl radical.

7. A composition according to claim 1 wherein said (meth)acrylate has the following structure:

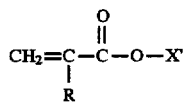

(II)

wherein R is H or methyl, and X' is selected from:
(a) an alkyl group having in the range of about 8 up to 24 carbon atoms, or

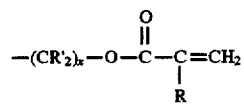

(b)

wherein each R' is independently selected from H or methyl, R is as defined above, selected independently of R of the core structure, and x is an integer falling in the range of about 2 up to 6.

8. A composition according to claim 7 wherein said (meth)acrylate is tridecyl methacrylate, 1,6-hexanediol dimethacrylate, 1,10-decanediol diacrylate, 1,10-decanediol dimethacrylate, 1,12-dodecanediol diacrylate or 1,12-dodecanediol dimethacrylate.

9. A composition according to claim 1 wherein said propargyl ether material has the following structure:

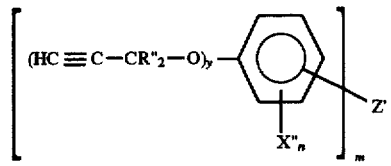

(III)

wherein:
X" is selected from alkyl, cycloalkyl, alkenyl, alkynyl, aryl, alkoxy, halogen, cyano, or the like;
Z', when present, is a di- or trivalent radical capable of linking two or three of the benzopyrene moieties;
each R" is independently selected from hydrogen or alkyl having up to 40 carbon atoms;
m is 1, 2 or 3; and
n is an integer from 0 up to 3; and
y is an integer from 1 up to 3.

10. A composition according to claim 1 wherein said isomerized propargyl ether material has the following structure:

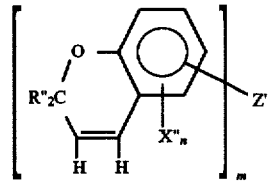

(IV)

wherein:
X" is selected from alkyl, cycloalkyl, alkenyl, alkynyl, aryl, alkoxy, propargyloxy or cyclized forms thereof, halogen or cyano;
Z', when present, is a di- or trivalent radical capable of linking two or three of the benzopyran moieties;
each R" is independently selected from hydrogen or alkyl having up to 40 carbon atoms;
m is 1, 2 or 3; and
n is an integer from 0 up to 3.

11. A composition according to claim 1 wherein said perfluorinated hydrocarbon polymer has an average bulk density in the range of about 250–500 g/L, a melting peak temperature (as determined by ASTM D1457) of 325±5° C., an average particle size distribution in the range of about 8–15 μm, a specific surface area in the range of about 8–12 m²/g, and a relatively narrow molecular weight distribution.

12. A composition according to claim 1 wherein said composition is a thixotropic paste.

13. A composition according to claim 1 wherein said composition is substantially free of solvent.

14. A composition according to claim 1 wherein:

said monomer vehicle comprises in the range of about 25 to 90 wt. percent of said composition, said perfluorinated hydrocarbon polymer comprises in the range of about 10 to 75 wt. percent of said composition, and said curing catalyst comprises in the range of about 0.01 to 10 wt. percent of said composition.

15. An assembly comprising a first article permanently adhered to a second article by a cured aliquot of a composition comprising:

a polymerizable monomer vehicle which, upon crosslinking, possesses good adhesion properties, a perfluorinated hydrocarbon polymer, and a curing catalyst.

16. An assembly comprising a microelectronic device permanently adhered to a substrate by a cured aliquot of a composition comprising:

a polymerizable monomer vehicle which, upon crosslinking, possesses good adhesion properties, a perfluorinated hydrocarbon polymer, and a curing catalyst.

17. A method for adhesively attaching a first article to a second article, said method comprising:

(a) applying an adhesive composition to said first article, wherein said adhesive composition comprises:

a polymerizable monomer vehicle which, upon crosslinking, possesses good adhesion properties, a perfluorinated hydrocarbon polymer, and a curing catalyst, (b) bringing said first and second article into intimate contact to form an assembly wherein said first article and said second article are separated only by the adhesive composition applied in step (a), and thereafter, (c) subjecting said assembly to conditions suitable to cure said adhesive composition.

18. A method for adhesively attaching a microelectronic device to a substrate, said method comprising:

(a) applying an adhesive composition to said substrate and/or said microelectronic device, wherein said adhesive composition comprises:

a polymerizable monomer vehicle which, upon crosslinking, possesses good adhesion properties, a perfluorinated hydrocarbon polymer, and a curing catalyst, (b) bringing said substrate and said device into intimate contact to form an assembly wherein said substrate and said device are separated only by the composition applied in step (a), and thereafter, (c) subjecting said assembly to conditions suitable to cure said composition.

\* \* \* \* \*